Patented Dec. 16, 1941

2,266,413

UNITED STATES PATENT OFFICE 2,266,413

AZO DYES

Moses L. Crossley, Plainfield, N. J., assignor, by mesne assignments, to American Cyanamid Company, New York, N. Y., a corporation of Maine No Drawing. Application March 29, 1937, Serial No. 133,559½

3 Claims. (Cl. 260—196)

This invention relates to new monazo dyes containing higher alkyl phenols as a component.

Many monazo dyes have been prepared in the past using phenol or methylated phenols as components. According to the present invention, it has been found that phenols having a longer alkyl chain give dyes of good shades with excellent properties such as milling, fastness to light and washing and the like. While valuable dyes may be produced from phenols having as short an alkyl chain as three carbon atoms, the most important dyes are those which contain alkyl phenols with still longer hydrocarbon chain, particularly the amyl and octyl phenols.

The new dyes of the present invention may contain solubilizing groups and it is an important advantage of this form of the invention that many of the dyes containing solubilizing groups will dye cellulose acetate as well as animal fibers. This is a very important property of certain of the colors falling under the present invention because as is well known, the dyeing of cellulose acetate presents a serious problem and has hitherto required special insoluble dyes which were used in a dispersed form thus greatly reducing the choice of shades which could be obtained satisfactorily with cellulose acetate and requiring a special dyeing procedure.

The soluble dyes of the present invention also have an important property of great light fastness and fastness to washing even in sea water. This makes it possible to use the soluble dyes for dyeing wool which must withstand sea water as, for example, bathing suits.

A wide variety of diazo compounds which can be coupled with the higher alkyl phenols of the present invention of course will produce dyes having a wide range of shades and the solubility of the resulting dyes will depend on the nature of the diazo component. Thus, for example, phenyl and naphthyl diazonium salts as well as their nitro, chlor and hydroxy derivatives which do not contain solubilizing groups will give water insoluble azo dyes with the higher alkyl phenols of the present invention. These products are in general soluble in organic solvents such as alcohols and aromatic hydrocarbons giving colored solutions usually varying in shade from yellow to bluish red. The solubility in aromatic hydrocarbons is a very important property of these dyes, and while I do not wish to limit my invention to any particular theory, I believe that the increased solubility in aromatic hydrocarbons is in considerable part due to the long alkyl chain.

The diazo components may also contain metallizable groups and very fast dyes are obtained by metallizing azo dyes of the present invention which contain suitable metallizable groups.

The invention will be described in greater detail in conjunction with the following typical examples:

EXAMPLE 1

50 kgs. of para nitro-ortho-anisidine are dissolved in 150 liters of concentrated hydrochloric acid and then added, with stirring to 1,500 liters of a mixture of ice and water. To this mixture is added 21 kg. of sodium nitrite in the form of a 20% solution, maintaining the temperature at 10–15° C. A positive starch iodide test holding for ten minutes is obtained. A solution of tertiary amyl phenol is then prepared by heating 18 kg. of the phenol with 14 kg. of caustic in 1,000 liters of water. This solution is cooled to 0° C. with ice and the above diazo solution added slowly, maintaining the temperature during the coupling at 0° C. The reaction mixture is maintained strongly alkaline to phenolphthalein by the addition of caustic soda solution when necessary. The dye separated, being insoluble in water, is filtered, washed and dried. It is a red-brown powder quite soluble in benzene; sparingly soluble in methyl alcohol. It colors nitrocellulose lacquer yellow. It has the following structural formula:

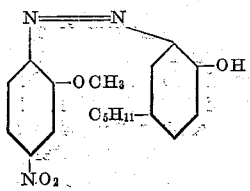

Instead of using para tertiary amyl phenol, the other isomeric amyl phenols may be employed, giving dyes having very similar shades.

EXAMPLE 2

50 kg. of para nitro-ortho-anisidine are dissolved in 150 liters of concentrated hydrochloric acid and then added, with stirring, to 1,500 liters of a mixture of ice and water. To this mixture is added 21 kg. of sodium nitrite in the form of a 20% solution, maintaining the temperature at 10–15° C. A positive starch iodide test holding for ten minutes is obtained. A solution of para octyl phenol is then prepared by heating 23 kg. of the phenol with 14 kg. of caustic in 1,000 liters of water. This solution is cooled to 0° C. with ice and the above diazo solution added slowly, maintaining the temperature during the coupling at 0° C. The reaction mixture is maintained strongly alkaline to phenolphthalein by the addition of caustic soda solution when necessary. The dye separated, being insoluble in water, is filtered, washed and dried. It is a red-brown powder, quite soluble in benzene; sparingly soluble in methyl alcohol. It colors nitrocellulose lacquer yellow. It has the following structural formula:

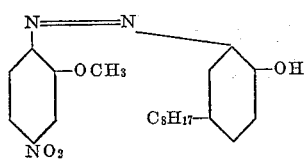

EXAMPLE 3

17.3 kg. of sulfanilic acid is diazotized in the usual way and coupled with a tertiary amyl phenol solution containing 18 kg. of the amyl phenol dissolved in a caustic solution containing 14 kg. of caustic in 1,000 liters of water. The phenol solution was previously cooled to 0° C. with ice and the coupling is conducted by adding the diazo to the phenol solution, maintaining the temperature between 0 and 5°. The reaction product is maintained alkaline to phenolphthalein by adding caustic when necessary. The product is salted out with sodium chloride, filtered and dried. It is soluble in water and dyes wool, silk and cellulose acetate yellow. The dye has the following structural formula:

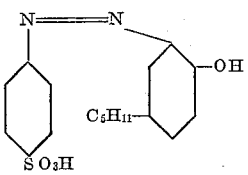

EXAMPLE 4

An amount of sodium naphthionate containing 49 parts of real is dissolved in 750 parts of water. To this solution is added sufficient sodium nitrite to furnish about 14 parts of real nitrite. This entire solution is then added to an aqueous hydrochloric acid solution containing 64 parts of concentrated hydrochloric acid in 500 parts of water. The mixture is cooled by means of ice to 10° C. and this temperature maintained throughout the diazotization. The diazo solution is then added to a solution of para tertiary amyl phenol containing 36 parts of the phenol dissolved in 2,000 parts of water containing 28 parts of caustic. The coupling was conducted at 0° C. It is maintained strongly alkaline to phenolphthalein throughout the reaction. The excess alkalinity at the end of the coupling is neutralized with acetic acid until it just showed a negative test for alkali with benzo purpurin paper. It is then salted, filtered and dried. The product is soluble in water and dyes wool and silk yellow to orange tones of color. It also dyes cellulose acetate yellow. It has the following structural formula:

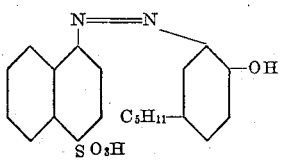

Other isomeric amyl phenols may be substituted for the para tertiary amyl phenol and similar products be obtained.

EXAMPLE 5

An amount of H acid equivalent to 128 kg. of real is dissolved in 1,500 liters of water, and the solution is made slightly alkaline with 16 kg. of caustic soda. To this solution is added 400 liters of normal nitrite solution. The entire mixture is then added gradually to a cold concentrated hydrochloric acid solution containing 224 liters of concentrated hydrochloric acid. The reaction is maintained at a temperature of approximately 10° C. A solution of ortho tertiary amyl phenol is prepared by dissolving 38 kg. of the phenol and 52 kg. of caustic in 2,000 liters of water. This was cooled to 0° and the diazo solution added slowly. When the coupling is complete the dye is precipitated by the addition of salt. It is then filtered and dried. It is water soluble and dyes wool and silk yellowish tones of brown but does not dye cellulose acetate. It has the following structural formula:

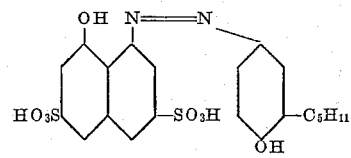

Similar products are obtained by substituting other isomeric amyl phenols for the para tertiary phenol. The products are similar in properties.

EXAMPLE 6

An amount of ortho aminophenol para sulfonic acid equivalent to about 76 parts real is dissolved in 1,500 parts of water containing sodium carbonate sufficient to dissolve the product. The solution is then acidified with 156 parts of concentrated hydrochloric acid and cooled with ice to 0° C. Sodium nitrite is then added slowly until a positive endpoint for completion of the diazotization is obtained and remains positive for 10 minutes. A solution of ortho tertiary amyl phenol is prepared by dissolving about 72 parts of the phenol in water containing 56 parts of caustic. The solution is cooled to 0° and the coupling conducted by running the diazo slowly into the phenol solution at a uniform rate. When the coupling is complete the dye is salted out with sodium chloride, filtered and dried. It is soluble in water, producing interesting tones of yellow on wool, silk and cellulose acetate. The dye has the following structural formula:

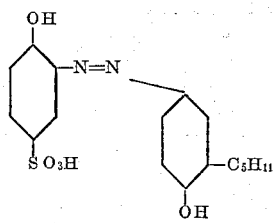

EXAMPLE 7

The diazo product obtained by treating 27.5 kg. of para nitraniline in 50 liters of water with 64 liters of concentrated hydrochloric acid diluted with 500 liters of water and diazotized with 14 kg. of nitrite at 0° C. is filtered and the solution added within 10 minutes to a para tertiary amyl phenol solution prepared from 36 kg. of the phenol and 64 kg. of caustic in 1,000 liters of water. The coupling is carried out at 0° C. The excess alkalinity is adjusted to a negative test on benzo purpurin paper and the dye salted out, filtered and dried. It is insoluble in water; soluble in benzene, alcohol and nitrocellulose lacquer, giving greenish tones of yellow. The product has the following structural formula:

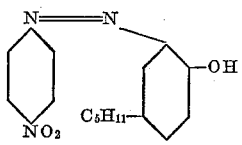

Similar products are obtained by substituting other isomeric amyl phenols for the para tertiary product.

The following table illustrates a number of other typical dyes which can be prepared by the general process described in the foregoing examples:

*Table*

| No. | Formula | Color |
|---|---|---|
| 1 | (structure with SO₃H, C₅H₁₁, OH) | Orange. |
| 2 | (naphthalene-SO₃H, C₅H₁₁, OH) | Orange red. |
| 3 | (Cl, C₅H₁₁, OH) | Yellowish orange. |
| 4 | (OCH₃, C₈H₁₇, OH) | Reddish orange. |
| 5 | (N(CH₃)₂, C₅H₁₁, OH) | Orange red. |
| 6 | (Cl, Cl, C₃H₇, OH) | Orange. |
| 7 | (NO₂, C₄H₉, OH) | Yellowish orange. |
| 8 | (COOH, C₅H₁₁, OH) | Yellowish orange. |
| 9 | (CH₃, C₅H₁₁, OH) | Orange. |
| 10 | (CH₃, CH₃, C₈H₁₇, OH) | Orange. |
| 11 | (HO, SO₃H, OH, C₅H₁₁) | Orange. |
| 12 | (naphthalene, C₅H₁₁, OH) | Red. |
| 13 | (naphthalene, C₃H₇, OH) | Red. |
| 14 | (C₈H₁₇, OH) | Orange. |
| 15 | (CH₃, Cl, SO₃H, C₅H₁₁, OH) | Reddish orange. |

I claim:

1. A monazo dye having the following formula

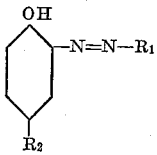

in which $R_1$ is an aromatic radical free from azo groups and $R_2$ is an alkyl group having more than four carbon atoms.

2. A monazo dye having the following formula

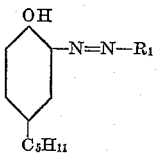

in which $R_1$ is an aromatic radical free from azo groups.

3. A monazo dye having the following formula
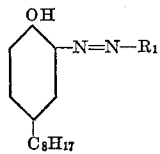
in which R₁ is an aromatic radical free from azo groups.
MOSES L. CROSSLEY.

Certificate of Correction

Patent No. 2,266,413.　　　　　　　　　　　　　　　　　　　　December 16, 1941.

MOSES L. CROSSLEY

It is hereby certified that errors appear in the printed specification of the above numbered patent requiring correction as follows: Page 3, first column, lines 66 to 69, for that portion of Formula No. 7 reading

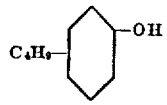

read

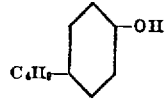

lines 71 to 75, Formula No. 8, and second column, lines 5 to 9, Formula No. 9, for

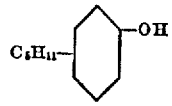

read

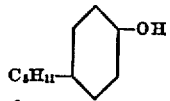

and lines 34 to 37, Formula No. 13, for

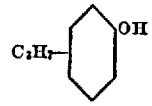

read

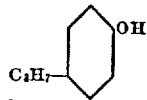

and lines 38 to 43, Formula No. 14, for

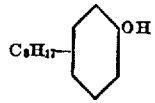

read

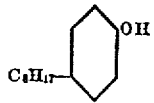

and that the said Letters Patent should be read with these corrections therein that the same may conform to the record of the case in the Patent Office.

Signed and sealed this 3rd day of March, A. D. 1942.

[SEAL]

HENRY VAN ARSDALE,
*Acting Commissioner of Patents.*